(12) United States Patent
Maccone et al.

(10) Patent No.: US 6,559,192 B2
(45) Date of Patent: May 6, 2003

(54) SEMIPERMEABLE POROUS MEMBRANES OF SEMI-CRYSTALLINE FLUOROPOLYMERS

(75) Inventors: Patrizia Maccone, Milan (IT); Paolo Fossati, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/083,294

(22) Filed: Feb. 27, 2002

(65) Prior Publication Data

US 2002/0156138 A1 Oct. 24, 2002

(30) Foreign Application Priority Data

Mar. 1, 2001 (IT) .......................... MI01A0421

(51) Int. Cl.$^7$ .................. C08J 9/28; B01D 39/00
(52) U.S. Cl. .................. 521/64; 210/500.42
(58) Field of Search .............. 210/500.42; 521/64

(56) References Cited

U.S. PATENT DOCUMENTS

| | | | |
|---|---|---|---|
| 4,623,670 A | 11/1986 | Mutoh et al. | 521/61 |
| 4,702,836 A | 10/1987 | Mutoh et al. | 210/500.23 |
| 6,060,530 A | 5/2000 | Chaouk et al. | 521/64 |

Primary Examiner—Morton Foelak
(74) Attorney, Agent, or Firm—Arent Fox Kintner Plotkin & Kahn

(57) ABSTRACT

Semipermeable porous membranes having an average pore diameter in the range 0.01–3 $\mu$m, and porosity in the range 30%–90%, based on semi-crystalline fluoropolymers and the respective preparation process, wherein the semi-crystalline fluoropolymers comprise:

(a) from 10 to 70% by moles of ethylene,
(b) from 30 to 90% by moles of a fluorinated monomer selected from tetrafluoroethylene, chlorotrifluoroethylene, or mixtures thereof,
(c) from 0.1 to 30% by moles, with respect to the total amount of monomers (a) and (b), of a hydrogenated monomer of formula:

$$CH_2=CH-(CH_2)_n-R_1 \qquad (I)$$

wherein $R_1=-OR_2$, or $-(O)_tC(O)_pR_2$ wherein t and p are integers equal to 0.1 and $R_2$ is a linear or branched $C_1-C_{20}$ alkyl, or a cycloalkyl, optionally containing heteroatoms and/or chlorine atoms, preferably heteroatoms are O or N; $R_2$ can optionally contain one or more functional groups, preferably selected from OH, COOH, epoxy, ester and ether group; $R_2$ can optionally contain double bonds, or it can be H; n is an integer in the range 0–10.

20 Claims, No Drawings

SEMIPERMEABLE POROUS MEMBRANES OF SEMI-CRYSTALLINE FLUOROPOLYMERS

The present invention relates to membranes of fluoropolymers suitable to be used for microfiltration and ultrafiltration.

More specifically the invention relates to semipermeable porous membranes based on copolymers ethylene/chlorotrifluoroethylene (E/CTFE) which show an optimal combination of chemical, thermal and mechanical resistance. For this very good combination of properties the membranes of the invention can be used for the purification (microfiltration) of strongly aggressive chemicals such as strong acids and bases.

Membranes of fluoropolymers for the chemical purification are known in the prior art. For example porous PVDF membranes are known, prepared by casting or by plasticization/subsequent extraction of the plasticizer. The drawback of these membranes is that they cannot be used in basic environment since they show poor chemical resistance.

Membranes based on ethylene/chlorotrifluoroethylene (E/CTFE) are also known, copolymer commercially known as Halar®, which are suitable for the microfiltration (purification) of strong acids and bases. See for example U.S. Pat. No. 4,623,670 and U.S. Pat. No. 4,702,836 wherein membranes for example of Halar® and the process for preparation thereof are described.

In U.S. Pat. No. 4,623,670 and U.S. Pat. No. 4,702,836 a procedure is described for preparing fluoropolymer membranes, i.e. of copolymers of ethylene with tetrafluoroethylene (E/TFE) or with chlorotrifluroethylene (E/CTFE) and homopolymers of chlorotrifluoroethylene (PCTFE), by mixing 10–60% by volume of polymer, with 7–42% by volume of inert compound (silica) and 30–75% by volume of PCTFE oligomers as plasticizer; afterwards the mixture is extruded to be plasticized at 250° C. and pellets of plasticized compound are thus obtained useful for the subsequent obtainment of manaufactured articles such as for example compression molded plaques, hollow fibers. The fluoropolymer membrane was obtained by a first extraction of the manufactured article with 1,1,1-trichloroethane at 50° C. for one hour to remove the plasticizer (PCTFE oligomers) and lastly by a subsequent extraction of the inert compound (silica) by NaOH at 40% at 70° C. for one hour. In this way membranes having a porosity in the range 40–90% with a pore average size of 0.01–5μm were obtained. The polymers of the aforesaid membranes are semi-crystalline compounds insoluble at room temperature and besides plasticizable at high temperature.

The drawback of the process described in the above patents is that it requires high plasticization temperatures and the use of high amounts of plasticizer formed by CTFE oligomers which is a very expensive product. If the plasticizer is used in amounts lower than 30% by volume, porous membranes are not obtained. Besides the use of high amounts of plasticizer has the drawback to require the addition of inert compound, for example silica, to give sufficient mechanical properties so to allow the extrusion of the manufactured articles to be subjected to the subsequent plasticizer extraction to obtain the porous membrane. In the extraction process a chlorinated solvent, 1,1,1-trichloroethane, is used, which, as well known, is highly toxic. The process requires also a further treatment with concentrated caustic soda for the extraction of the inert compound (silica). Therefore the process results complicated and expensive.

The need was therefore felt to have available porous membranes of fluoropolymers obtainable by a simplified and cheap process which avoided the drawbacks of the above prior art.

Membranes based on fluoropolymers ethylene/chlorotrifluoroethylene (Halar®) and their preparation process solving the above technical problem, have been unexpectedly and surprisingly found.

An object of the present invention are therefore semipermeable porous membranes having the average pore diameter in the range 0.01–3 μm, more specifically 0.1–0,7 μm, and a porosity in the range 30%-90%, based on semi-crystalline fluoropolymers mainly formed by ethylene copolymers with chlorotrifluoroethylene and/or tetrafluoroethylene and at least another monomer comprising:
(a) from 10 to 70%, preferably from 35 to 55%, by moles of ethylene,
(b) from 30 to 90%, preferably from 45 to 65%, by moles of a fluorinated monomer selected from tetrafluoroethylene, chlorotrifluoroethylene, or mixtures thereof,
(c) from 0.1 to 30%, preferably from 1 to 15%, by moles, with respect to the total amount of monomers (a) and (b), of a hydrogenated monomer of formula:

$$CH_2=CH-(CH_2)_nR_1 \qquad (I)$$ 

wherein $R_1=-OR_2$, or $-(O)_tCO(O)_pR_2$ wherein t and p are integers equal to 0.1 and $R_2$ is a linear or branched $C_1-C_{20}$ alkyl, or a cycloalkyl, optionally containing heteroatoms and/or chlorine atoms, preferably the heteroatoms are O or N;

$R_2$ can optionally contian one or more functional groups, preferably selected from OH, COOH, epoxy, ester and ether group; $R_2$ can optionally contain double bonds, or it can be H;

n is an integer in the range 0–10.

More preferred compositions of the invention copolymers are the following:
(a) from 35 to 45%, by moles of ethylene,
(b) from 55 to 65% by moles of a fluorinated monomer selected from tetrafluoroethylene, chlorotrifluoroethylene, or mixtures thereof,
(c) from 3.5 to 11.5% by moles, with respect to the total amount of monomers (a) and (b), of a hydrogenated monomer of formula (I).

The preferred comonomers (c) are for example selected from the following classes:
1) Acrylic monomers having general formula:

$$CH_2=CH-CO-O-R_2$$ 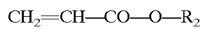

wherein $R_2$ has the above meaning.
Ethylacrylate, n-butylacrylate, acrylic acid, hydroxyethylacrylate, hydroxypropylacrylate, (hydroxy) ethyl-hexylacrylate can for example be mentioned.
2) Vinylether monomers having general formula:

$$CH_2=CH-O-R_2$$ 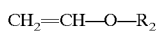

wherein $R_2$ has the above meaning.
Propylvinylether, cyclohexylvinylether, vinyl-4-hydroxybutylether can for example be mentioned.
3) Vinyl esters of the carboxylic acid having general formula:

$$CH_2=CH-O-CO-R_2$$ 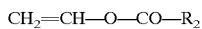

wherein $R_2$ has the above meaning.

Vinyl-acetate, vinylpropionate, vinyl-2-ethylhexannoate can for example be mentioned.

4) Unsaturated carboxylic acids having general formula:

$$CH_2=CH-(CH_2)_n-COOH$$

wherein n has the above meaning.

For example vinylacetic acid.

Preferably as comonomers the acrylic ones of class 1) are used.

The membranes of the present invention are obtained from the above mentioned fluoropolymers which are semi-crystalline and therefore show a melting point determinable by calorimetric analaysis (DSC).

The membranes of the present invention are obtained starting from the above semi-crystalline fluoropolymers by their plasticization, with plasticizers suitable to obtain a solution, subsequently formed in a membrane and then subjected to the plasticizer extraction. In particular the process comprises the hot mixing of the aforesaid polymers with one or more plasticizers. The temperature at which the solution is prepared ranges from 140° C. to 195° C., preferably from 160° C. to 180° C.

The so obtained solution is worked by extrusion, molding by injection or compression to give the desired shape to the membrane. Then the so obtained membrane is dipped into a solvent to extract the plasticizer. It is possible to extract at room temperature obtaining a complete plasticizer extraction in a time ranging from some minutes to some hours, depending on the thickness, the type of the extractant and stirring. Generally times of few minutes are sufficient to completely extract the plasticizer. After extraction the porous invention membrane is obtained.

The plasticizers used in the process are selected from the plasticizers known in the prior art having a vapour pressure lower than 5 mm Hg, preferably lower than 2 mm Hg, at the temperature of 160° C.

The plasticizer amount ranges between 10% and 70% by weight with respect to the fluoropolymer, preferably between 25% and 65%, more preferably between 35% and 55%, depending on the porosity of the final membrane one wants to obtain.

Hydrogenated plasticizers are preferably used. Citrates, phthalates, trimellitates, adipates can for example be mentioned. Preferably citrates and trimellitates are used, in particular acetyltri-n-butylcitrate and trihexyltrimellitate. The hydrogenated plasticizers preferably used in the invention are available on the market at low costs. This represents an advantage of the present invention.

As extraction solvents, solvents wherein the plasticizer is soluble, but which are not compatible with the fluoropolymer, so as not to cause the swelling thereof, are used.

The most commonly used class of solvents is that of aliphatic alcohols, preferably having a short chain, for example from 1 to 6 carbon atoms, more preferably methanol and isopropanol.

The mebranes of the present invention have a high chemical resistance. Dipping tests in an aqueous solution of sodium hydroxide (NaOH) at 30% by weight at the temperature of 50° C. have shown that even after one month the membrane substantially shows the same initial mechanical properties, for example tensile properties, such as modulus, stress and strain yield, stress and elongation at break. Besides the membrane does not show phenomena of colour variation (discoloration).

Some Examples follow for illustrative and not limitative purposes of the invention.

EXAMPLES

Characterization

Porosity Determination

The porosity is calculated as follows:

$$\text{Porosity } \% = (d_i - d_{mp})/d_i \cdot 100$$

wherein $d_i$=initial density of the polymer;

$d_{mp}$=density of porous membrane obtained from the polymer after the plasticization process and subsequent extraction.

The densities are determined by weighing of the specimen in air and in water at the temperature of 25° C. according to the ASTM D 792 method.

Measurements of Permeability to Water

The permeability is measured by using glass cups, having a 100 ml capacity, an external diameter of 54 mm and an internal one of 50 mm. The cups are filled with 50 ml of water, covered with the specimen of the membranes and then placed, overturned, in a drier containing silica gel so as to create an external environment to the specimen and to the cup wherein the humidity is equal to zero. The permeability to water is determined by gravimetry, weighing in the time the cup and quantifying the weight loss in the unit of time.

Average Size of the Pores

It has been determined by analysis of the AFM (Atomic Force Microscopy) photos carried out by the Autoprobe CP instrument by Park Scientific Instruments and of the SEM (Scanner Electonic Microscopy) photos carried out by the Cambridge Stereoscan S200 instrument.

Chemical Resistance Measurements

They have been carried out by a dipping method in an aqueous solution of sodium hydroxide at 30% by weight (ASTM D 543).

Example 1

A mixture has been prepared containing 15.708 g of a terpolymer ethylene/chlorotriflucroethylene/butylacrylate (40.4/-55.1/4.5% by moles; the percentage of butylacrylate with respect to the sum of E/CTFE is 4.7) and 10 ml of acetyltri-n-butylcitrate as plasticizer, under mechanical stirring, at a temperature of 180° C.

Once cooled, said mixture has been moulded by compression bettween two aluminum sheets at 200° C.

The so obtained plaque, having a thickness of 0.30 mm, has been dipped into methanol at room temperature for 24 hours.

A continuous membrane without visually detectable surface defects was obtained, the properties of density, porosity and permeability of which are reported in Table 1.

Example 2

Comparative

The terpolymer of Example 1 has been moulded by compression at 200° C. obtaining two plaques having a thickness of 0.10 mm.

On the former plaque, having a density equal to 1.66 g/ml, the permeability to water has been determined; it resulted equal to 0.11 g·mm/(m²·24 h).

The latter plaque has been dipped into methanol at room temperature for 24 hours.

A continuous membrane without visually detectable defects was obtained, the density and permeability to water of which resulted equal to those of the former plaque the values of which are reported in Table 1.

If the density, porosity and permeability data of Example 1 are compared with those of Example 2, it can be seen that the presence of the plasticizer allows to obtain porous membranes.

Example 3

Comparative

A mixture containing 11.317 g of the terpolymer of Example 1 and 20 ml of acetyltri-n-butylcitrate was prepared under mechanical stirring, at a temperature of 180° C.

Once cooled, said mixture has been moulded by compression between two aluminum sheets at 200° C.

The so obtained plaque, having a thickness of 0.05 mm has been dipped into acetone at room temperature for 24 hours.

A continuous membrane without visually detectable defects was obtained, the properties of which are reported in Table 1.

Example 4

The plaque, having a thickness of 0.05 mm obtained from the preparation of Example 3, has been dipped into methanol at room temperature for 24 hours.

A continuous membrane without visually detectable defects was obtained, having an average size of the pores around 0.3 μm, the properties of which are reported in Table 1.

From the comparison of the results of Examples 3 and 4 it results that the extracting solvent used in Example 3 is not suitable since it swells the used fluoropolymer. On the contrary the same test repeated with methanol does not show any appreciable swelling.

Example 5

A mixture containing 9.988 g of a terpolymer ethylene/chlorotrifluoroethylene/butylacrylate (35/55/10% by moles; the percentage of butylacrylate with respect to the sum of E/CTFE is of 11.1) and 3 ml of acetyltri-n-butylcitrate, has been prepared under mechanical stirring, at a temperature of 180° C.

Once cooled, said mixture has been moulded by compression between two aluminum sheets at 200° C.

The so obtained plaque, having a thickness of 0.05 mm has been dipped into methanol at room temperature for 24 hours.

A continuous membrane without visually detectable defects was obtained, the properties of which are reported in Table 1.

Example 6

Comparative

The terpolymer of Example 5 has been moulded by compression at 200° C. obtaining two plaques having a thickness of 0.40 mm.

On a plaque having a density equal to 1.66 g/ml the permeability to water was determined.

The other plaque has been dipped into methanol at room temperature for 24 hours.

A continuous membrane without visually detectable defects was obtained, the density and permeability to water of which resulted equal to those of the previous plaque.

The results are reported in Table 1.

The data reported in Table 1 referred to Examples 5 and 6 (comparative) show the same trend of Examples 1 and 2 as above reported.

Besides, if the data of Example 5 are compared with those of Example 1, it is noticed that by increasing the amount of butyl acrylate, the same porosity and density values are reached, even operating with a lower amount of plasticizer.

Example 7

Example 1 has been repeated using as plasticizer the trihexyltrimellitate instead of acetyltri-n-butylcitrate and a plaque having a thickness equal to 0.06 mm instead of 0.30 mm.

A continuous membrane without visually detectable defects was obtained, the properties of which are reported in Table 1.

Example 8

Comparative

An ethylene/chlorotrifluoroethylene copolymer (49/51% by moles) has been used as fluoropolymer: to 8.5 g of polymer, 15 ml of acetyltri-n-butylcitrate have been added under stirring at a temperature of 180° C.

No solution was obtained since the two separated phases of copolymer and plasticizer were noticed. Even by increasing the temperature up to 200° C. no solution was obtained. Therefore it is not possible to obtain porous membranes.

TABLE 1

| Example | Composition (% by moles) | | | Plasticizer | | Density | Porosity | Permeability to $H_2O$ |
|---|---|---|---|---|---|---|---|---|
| | E | CTFE | BuA | (% by weight) | Solvent | (g/ml) | (%) | (g · mm/m² · 24 h) |
| 1 | 40.4 | 55.1 | 4.5 | Acetyltri-n-butylcitrate (40) | Methanol | 0.87 | 48 | 23 |
| 2 (comp) | 40.4 | 55.1 | 4.5 | — | Methanol | 1.66 | 0 | 0.11 |
| 3 (comp) | 40.4 | 55.1 | 4.5 | Acetyltri-n-butylcitrate (65) | Acetone | 1.35 | 19 | — |
| 4 | 40.4 | 55.1 | 4.5 | Acetyltri-n-butylcitrate (65) | Methanol | 0.81 | 51 | — |
| 5 | 35 | 55 | 10 | Acetyl-n-butylcitrate (24) | Methanol | 0.88 | 47 | — |
| 6 (comp) | 35 | 55 | 10 | — | Methanol | 1.66 | 0 | — |

TABLE 1-continued

| | Composition (% by moles) | | | Plasticizer | | Density | Porosity | Permeability to H₂O |
|---|---|---|---|---|---|---|---|---|
| Example | E | CTFE | BuA | (% by weight) | Solvent | (g/ml) | (%) | (g · mm/m² · 24 h) |
| 7 | 40.4 | 55.1 | 4.5 | Trihexyl-trimellitate (40) | Methanol | 0.92 | 45 | — |
| 8 (comp) | 49 | 51 | — | Acetyltri-n-butylcitrate (65) | | It is not soluble | | |

What is claimed is:

1. A semipermeable porous membrane having the average pore diameter in the range of 0.01–3.0 µm, the porosity of which is in the range of 30%–90%, based on semi-crystalline fluoropolymers mainly formed by ethylene copolymers with chlorotrifluoroethylene and/or tetrafluoroethylene and at least one other monomer comprising:

(a) from 10 to 70% by moles of ethylene, (b) from 30 to 90% by moles of a fluorinated monomer selected from tetrafluoroethylene, chlorotrifluoroethylene, or mixtures thereof, (c) from 0.1 to 30% by moles, with respect to the total amount of monomers (a) and (b), of a hydrogenated monomer of formula (I):

$$CH_2=CH-(CH_2)_n-R_1 \qquad (I)$$

wherein $R_1=-OR_2$, or $-(O)_tCO(O)_pR_2$, wherein t and p are integers equal to 0.1 and $R_2$ is a linear or branched $C_1-C_{20}$ alkyl, or a cycloalkyl, optionally containing heteroatoms and/or chlorine atoms; $R_2$ can optionally contain one or more functional groups; $R_2$ can optionally contain double bonds, or it can be H;

n is an integer in the range of 0–10.

2. Membranes according to claim 1, wherein the fluoropolymer is formed by:

(a) from 35 to 45%, by moles of ethylene, (b) from 55 to 65% by moles of a fluorinated monomer selected from tetrafluoroethylene, chlorotrifluoroethylene, or mixtures thereof, (c) from 3.5 to 11.5% by moles, with respect to the total amount of monomers (a) and (b), of a hydrogenated monomer of formula (I).

3. Membranes according to claim 1, wherein the comonomers (c) are selected from the following classes:

1) Acrylic monomers having general formula:

$$CH_2=CH-CO-O-R_2$$

wherein $R_2$ has the above meaning;

2) Vinylether monomers having general formula:

$$CH_2=CH-O-R_2$$

wherein $R_2$ has the above meaning;

3) Vinyl esters of the carboxylic acid having general formula:

$$CH_2=CH-O-CO-R_2$$

wherein $R_2$ has the above meaning; and

4) Unsaturated carboxylic acids having general formula:

$$CH_2=CH=(CH_2)_n-COOH$$

wherein n has the above meaning.

4. Membranes according to claim 3, wherein the comonomers (c) are the acrylic ones of class 1).

5. A process for preparing the membranes of claim 1, starting from the semi-crystalline fluoropolymers by their plasticization with plasticizers until a solution is obtained which is subsequently formed in a membrane and from which the plasticizers are then extracted.

6. A process according to claim 5, wherein the solution of fluoropolymers with one or more plasticizers is obtained at a temperature from 140° C. to 195° C.

7. A process according to claim 5, wherein the used plasticizers have a vapour pressure lower than 5 mm Hg at the temperature of 160° C.

8. A process according to claim 5, wherein the amount of plasticizers ranges between 10% and 70% by weight with respect to the fluoropolymer.

9. A process according to claim 5, wherein hydrogenated plasticizers are used.

10. A process according to claim 9, wherein the plasticizers are selected from citrates, phthalates, trimellitates, adipates.

11. A process according to claim 5, wherein the extraction solvents are selected from the solvents wherein the plasticizer is soluble, but which are not compatible with the fluoropolymer so as not to cause the swelling thereof.

12. A process according to claim 11, wherein the solvents are selected from aliphatic alcohols.

13. A process according to claim 12, wherein the solvents are methanol and isopropanol.

14. The semipermeable porous membrane of claim 1, wherein said membrane has an average pore diameter in the range of 0.1–0.7 µm, and wherein said membrane comprises 35 to 55% by moles of ethylene, 45 to 65% by moles of a fluorinated monomer selected from tetrafluoroethylene, chlorotrifluoroethylene, or mixtures thereof, 1 to 15% by moles, with respect to the total amount of monomers (a) and (b), of a hydrogenated monomer of formula (I); and wherein $R_2$ of said formula (I) contains heteroatoms and said heteroatoms are O or N, and wherein $R_2$ also contains one or more functional groups selected from the group consisting of OH, COOH, epoxy, ester and ether group.

15. The process according to claim 6, wherein the temperature is 160° C. to 180° C.

16. The process according to claim 7, wherein the vapour pressure is lower than 2 mm Hg.

17. The process according to claim 8, wherein the amount of plasticizers ranges between 25% and 65% by weight with respect to the fluoropolymer.

18. The process according to claim 8, wherein the amount of plasticizers ranges between 35% and 55% by weight with respect to the fluoropolymer.

19. The process according to claim 10, wherein the plasticizers are citrates and trimellitates.

20. The process according to claim 12, wherein the solvents are selected from aliphatic alcohols having a short chain of 1 to 6 carbons.

* * * * *